Oct. 15, 1940.                H. H. CHAFVIN                2,218,392
                    FILM DEVELOPING AND FIXING REEL
                          Filed April 29, 1937

INVENTOR.
HARRY H. CHAFVIN.
BY
Allen & Allen
ATTORNEYS.

Patented Oct. 15, 1940

2,218,392

UNITED STATES PATENT OFFICE 2,218,392

FILM DEVELOPING AND FIXING REEL

Harry H. Chafvin, Cincinnati, Ohio

Application April 29, 1937, Serial No. 139,671

8 Claims. (Cl. 242—77)

My invention relates to a film developing and fixing tank for the developing and fixing of photographic roll film wherein the film is wound on a spool spirally with a space between each convolution of the film, and the spool carrying the film is placed in a metal tank which is filled with the necessary developer for devoping the film. The tanks preferably have a cover or lid with an aperture permitting the insertion of liquid into the tank but covered with a light trap so that the actual developing of the film may be done in the light without any danger of striking or ruining the film.

It is an object of my invention to provide a film holder in the form of a reel which predetermines the position of a film on the reel and in which the film is only contacted on the narrow portion next to the edge.

It is a further object of my invention to provide a film holding reel on which the film may be readily placed in total darkness without the necessity of fingering or handling the film on either of its surfaces, and without the necessity of practiced manipulation in loading the reel.

It is a further object of my invention to provide a film tank and a film holding reel which may be used with a plurality of films of different widths.

These and other objects of my invention which will be set forth hereinafter or will be apparent to one skilled in the art upon reading this specification, I accomplish by that certain construction and arrangement of parts of which I shall now describe a preferred embodiment.

Briefly in the practice of my invention, I provide a film holding reel composed of a pair of end members spaced apart and formed by a single continuous U-shaped channel which is spirally wound to form the end pieces in such a manner that the opening of the channels of the pair face each other and are in registry with each other. These two ends are held apart by a pair of telescopic tubes fastened to each end, and which have means for maintaining the ends in a predetermined spaced relation. The film is inserted or mounted on the reel by starting the film on the outside ends of the channels so that the edges of the film will slip into the channels themselves, and by pushing the film into the channels it will follow them and position itself in a spiral determined by the spiral of the channels.

The tank or container which holds the reel is cylindrical in form and of a slightly larger diameter than the overall diameter of the end pieces. The tank is deep enough to just accommodate the reel when the end pieces are at their greatest distance apart.

Reference is now made to the drawing which forms a part thereof, and in which.

Figure 4:
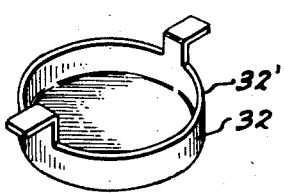
Fig. 4 is a perspective of the light trap associated with the top of the tank.
Figure 1:
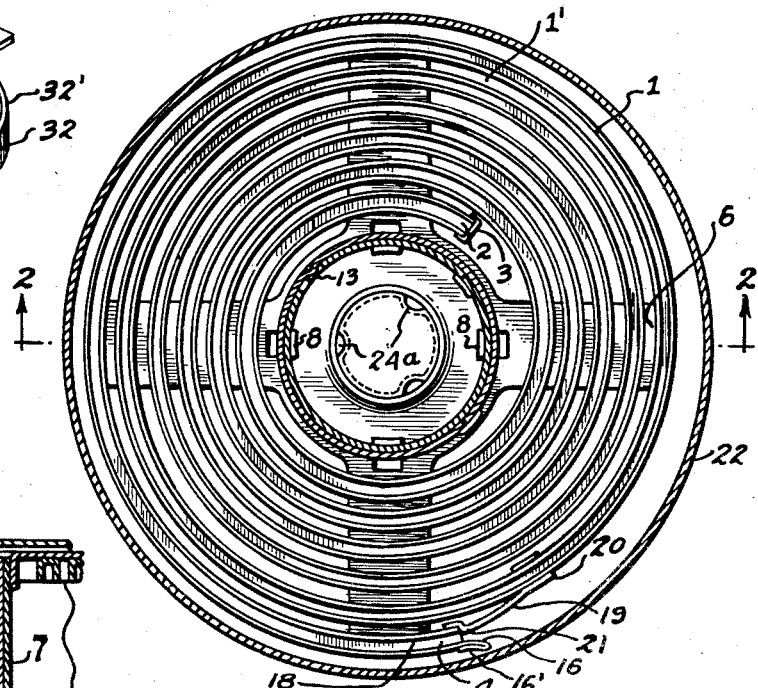
Figure 1 is a cross section view of one end of my reel and tank taken on the section line 1—1 of Fig. 2.

In the practice of my invention I provide a U-shaped channel 1 which is wound in a single plane in the form of a spiral with the inner end 2 closed by a piece of strap metal 3, and with the outer end 4. I preferably make my channel of stainless steel although other materials may be used, and I do not intend to limit myself to any special kind of material. The channel 1 is so wound that the opening 5 of the channel lies in a single plane and the spiral configuration of the channel is maintained by a metallic spider shaped brace 6, which is preferably spot welded to the back of the channel 1.

The channel 1 is mounted on the tube 7 by means of spot welding the spider 6 to the tube. I preferably strike down fingers 8 from the spider 6 and spot weld these fingers 8 to the outside of the tube 7.

The second or opposite end piece of my novel reel is formed in exactly the same manner as the one described in the above paragraph, except that the spiral is in the reverse and the channel portion 1 in this case is mounted by means of its spider 6' to the metal tube 9 with the fingers 8 spot welded to the inside of the tube 9. The two tubes 7 and 9 are telescoped into each other, the tube 9 being on the inside of the tube 7. These tubes 7 and 9 are preferably formed of a sheet of stainless steel bent in the form of a cylinder with their ends abutting, and with fingers 10 struck up from one end and overlapping and spot welded to the opposite and abutting end. In order to permit the relative telescoping of the tubes 7 and 9 the fingers 10 on the inside tube 9 are placed on the inside of the tube while the fingers 10 on the outside tube 7 are placed on the outside of that tube.

In order to space the pair of end members a predetermined distance apart, I place a slot 11 within the tube 9 with a plurality of locking or key slots 12 branching off from the main slot 11. The outer tube 9 carries a bayonet pin 13 which rides in the slot 11 and the locking slots 12. I preferably place a cap 14 on the end of my tube 9, and an apertured cap 15 at the other end of the inner tube 9 in order to give the reel a finished appearance. The bayonet pin 13 and the lock slots 12 are so positioned that when the bayonet pin 13 is within one of the lock slots 12, the two oppositely positioned spiral channels 1 are in registry with each other.

In order to facilitate the entry of the end of a film into my channels 1, I cut the ends 4 of my channels 1 with a lip 16 on the outside wall, which is folded back as at 16' to form a smooth surface. This lip 16 is preferably bent away from the center of the reel in order to form a guiding member for inserting the end of the film. On the opposite wall 18 of the channel ends 4, I place a second guide member 19, which is composed of a strap of metal spot welded to the outside of the wall 18 and bent down and contacting the wall to the succeeding convolution of the spiral at 20. Preferably I lap a portion of the piece 19 around the bottom or base of the channel 1, and spot weld it in position. The channel 19 is bent upwardly as it passes the end 16 of the channel 1 in such a manner that a slight hump having a smooth surface partly impedes the entrance to the channel. This hump 21 prevents a film after once placed on the reel, from sliding out without being actually pulled out by the fingers.

From the above it is apparent that by the relative telescoping of the tubes 7 and 9, the distance between the channel end pieces 1 may be varied, and are only determined by the lengths of the tubes 7 and 9, and by the positioning and number of the lock slots 12.

It is also apparent that due to the fact that the slot 11 runs out to the end of the tube 9, that the two ends 1 of the spool may be completely pulled apart and disassembled, which is a decided advantage at times in removing a film from the reel after developing and fixing.

The tank in which my novel film holder is placed, comprises a cylindrical casing preferably composed of stainless steel with a cylindrical side wall 22, and a bottom 23. Struck up from the bottom 23 is a journal 24 which preferably fits within the tube end piece 15, in order to determine the centering of the spool. The journal 24 is preferably of sufficient height to slightly lift the reel off the bottom 23 of the tank and preferably has indented channels 24a in its sides to permit the flow of liquid from within the tube 9 to the bottom of the tank and under the reel. The side wall 22 of the tank has a bead 25 struck out from the side to determine the positioning of the top as is well known in the art.

The top of the tank comprises a cylindrically formed metal piece 26 having side walls 27, which telescope over the side walls 22 of the tank and contact the bead 25. The top portion 26 has a circular bead 29 pressed therein, and an aperture 30 having a neck 31 positioned in the center of the top and covered by a light trap 32 held by spot welded legs 33 to the top. It may be advantageous to place a cap 53 within the aperture 30 in order to give the completed and enclosed tank a finished appearance. A vent or pouring spout 34 is formed in the bead 29 and a plate 35 is preferably spot welded under this vent to form a light trap.

From the above it is apparent that the loaded reel may be placed in the tank and the lid placed in position. The developing fluid may then be poured through the opening 30 in the top and flows over the rim 32' of the light trap 32, down around the reel and the film contained therein. A special feature of my invention is that the channel 1 when spirally wound has a continuous opening 1', between each convolution, which permits the liquid when poured into the tank to quickly flow around and completely immerse the film 40 carried on the reel.

After the film has been properly developed, the used developer may be poured out of the tank through the vent 34, and a fixer or washing solution again poured in the tank through the aperture 30. The apertures 30 and 34 are both perfectly light tight and while it is necessary to load the reel with the film in a dark spot, the actual developing, washing and fixing may be done in ordinary daylight.

Figure 3:
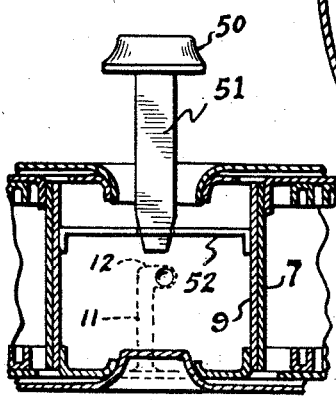
Fig. 3 is a detailed section of a modification of the telescopic tubes on which the reel ends are mounted.
Figure 5:
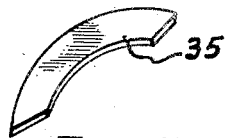
Fig. 5 is a perspective of the light trap covering the pouring vent of the top.
Figure 2:
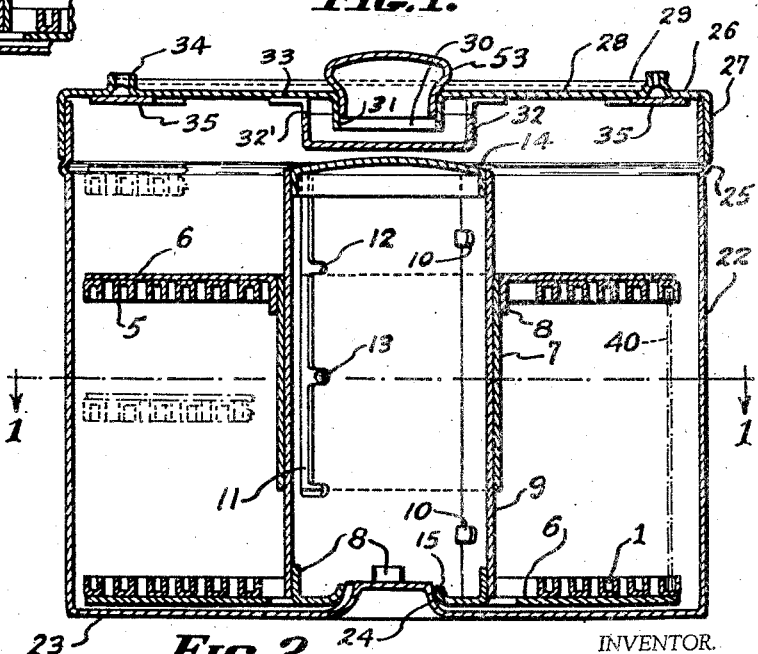
Fig. 2 is a vertical section of my novel reel and tank taken on the section line 2—2 of Fig. 1.

The modification illustrated in Fig. 3, is similar to the reel heretofore described excepting that the reel is made for one size of film only, and therefore the slot 11 has only on locking slot 12, and the cap 14 is preferably omitted inasmuch as the tube 9 does not project beyond the end of the tube 7. I may also use an agitator knob 50 as is illustrated in Fig. 3 having a shank 51 with a flat end which projects in a slot in a cross-strap 52, spot welded within the tube 9. Of course, the agitator may be used with the modification illustrated in Fig. 2 by a similar arrangement, well known in the art.

I have found my reel unusually compact and sturdy and of such a construction that with its co-operating tank or casing it uses the very minimum of developing and fixing solutions while at the same time completely submerging the film. While the film is usually removed from the spool by pulling it along the channels in the opposite direction to which it was placed on the reel, it is sometimes desirable, particularly if the film should jam, to be able to quickly break apart the reel in removing the film. This may be readily done with my invention.

It is to be understood that different forms of my preferred form may be made without departing from the spirit of my invention. Having thus described my invention, what I claim as new and desire to secure by Letters Patent is:

1. A film holder comprising a pair of channels each wound in a spiral with a continuous opening between the convolutions of said spiral, said spirals facing each other with their openings facing each other and in registry, and means for holding said spiral channels in spaced relation, said continuous opening allowing unobstructed flow of fluid from one side of the spiral to the other.

2. A film holder comprising a pair of channels each wound in a spiral with a continuous opening between the convolutions of said spiral, said spirals facing each other with their openings facing each other and in registry, said continuous opening allowing unobstructed flow of fluid from one side of the spiral to the other, means for holding said spiral channels in spaced relation, said channel holding means comprising a pair of telescoping metal tubes one attached to each spiral channel and having means for locking said tubes in telescoped relation.

3. A film edge holder comprising a channel having a U-shaped cross-section and wound in a spiral with the opening of the channel in one plane for receiving the film edge, and having a continuous opening between the convolutions of the spiral, said continuous opening allowing unobstructed flow of fluid from one side of the spiral to the other.

4. A film edge holder comprising a channel having a U-shaped cross-section and wound in a spiral with the opening of the channel in one plane, the inner end of said channel being closed and the outer end of said channel having a lip associated with the wall of the channel and contacting the succeeding convolution.

5. A film edge holder comprising a channel having a U-shaped cross-section and wound in a spiral with a continuous space between the convolutions of the spiral and with the opening of the channel in a single plane, the inner end of said channel being closed and the outer end of the channel having extending lips associated with the channel walls, the inner lip contacting the succeeding convolution and having a projecting hump therein, to facilitate the entry of a film into said channel.

6. A film reel comprising a pair of film edge holders as set forth in claim 5 with the spiral of one edge holder being the reverse of the other, and with the channel openings facing and in registry with each other, said channels being mounted on a pair of telescoping tubes, means on said tubes for removably positioning the film edge holders a predetermined distance from each other and insuring their registry.

7. A film reel comprising a pair of film edge holders as set forth in claim 5 with the spiral of one edge holder being the reverse of the other, and with the channel openings facing and in registry with each other, said channels being mounted on a pair of telescoping tubes, means on said tubes for removably positioning the film edge holders a predetermined distance from each other and insuring their registry, said positioning means being capable of a plurality of settings for a plurality of different predetermined positions.

8. A film reel comprising a pair of film edge holders as set forth in claim 5 with the spiral of one edge holder being the reverse of the other, and with the channel openings facing and in registry with each other, said channels being mounted on a pair of telescoping tubes, means on said tubes for removably positioning the film edge holders a predetermined distance from each other and insuring their registry, said positioning means being capable of a plurality of settings for a plurality of different predetermined positions, said positioning means comprising a longitudinal slot in one tube with offset slots and a bayonet pin in the other tube slidably positioned in said slot.

HARRY H. CHAFVIN.